(12) United States Patent
Shin et al.

(10) Patent No.: US 9,372,655 B2
(45) Date of Patent: Jun. 21, 2016

(54) IMAGE DISPLAY APPARATUS, METHOD OF DRIVING IMAGE DISPLAY APPARATUS, AND COMPUTER READABLE RECORDING MEDIUM

(71) Applicant: SAMSUNG ELECTRONICS CO., LTD., Suwon-si, Gyeonggi-do (KR)

(72) Inventors: Wong-yong Shin, Suwon-si (KR); Sun-young Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/323,228

(22) Filed: Jul. 3, 2014

(65) Prior Publication Data

US 2015/0195476 A1 Jul. 9, 2015

(30) Foreign Application Priority Data

Jan. 6, 2014 (KR) .................... 10-2014-0001446

(51) Int. Cl.
*H04N 7/00* (2011.01)
*H04N 11/00* (2006.01)
*G06F 3/14* (2006.01)
*H04N 5/232* (2006.01)
*H04N 21/422* (2011.01)
*H04N 21/431* (2011.01)
*H04N 21/436* (2011.01)
(Continued)

(52) U.S. Cl.
CPC .......... *G06F 3/1423* (2013.01); *H04N 5/23293* (2013.01); *H04N 21/42203* (2013.01); *H04N 21/436* (2013.01); *H04N 21/4316* (2013.01); *H04N 21/4383* (2013.01); *H04N 21/482* (2013.01); *H04N 21/485* (2013.01); *H04N 5/50* (2013.01); *H04N 5/60* (2013.01)

(58) Field of Classification Search
USPC ................ 348/552, 570, 731, 732, 730, 714, 348/358.1, 389.1, 388.1; 709/203, 221, 709/222, 226, 229, 231, 232; 710/8, 313; 700/37, 237; 370/227, 236.1, 264, 305, 370/329, 431, 433, 441; 725/41, 43, 89, 725/131, 134, 142
See application file for complete search history.

(56) References Cited

U.S. PATENT DOCUMENTS 6,295,646 B1 * 9/2001 Goldschmidt Iki ... H04N 5/44543
348/564
6,466,982 B1 * 10/2002 Ruberg .................... G06F 9/52
709/227

(Continued)

FOREIGN PATENT DOCUMENTS

KR 10-2005-0015209 2/2005
KR 10-2011-0113617 10/2011
(Continued)

*Primary Examiner* — Jefferey Harold
*Assistant Examiner* — Mustafizur Rahman
(74) *Attorney, Agent, or Firm* — Staas & Halsey LLP (57) ABSTRACT

An image display apparatus, a method of driving the image display apparatus, and a computer readable recording medium are disclosed. The image display apparatus includes at least one operation executor configured to perform a random operation, a communication interface configured to request resource sharing to the peripheral device and to receive a result of the request in order to share resource of the peripheral device, and a controller configured to control the communication interface for the request and the reception and to control the operation executor to perform the operation according to the received result.

16 Claims, 8 Drawing Sheets

(51) Int. Cl.
   *H04N 21/438*   (2011.01)
   *H04N 21/482*   (2011.01)
   *H04N 21/485*   (2011.01)
   *H04N 5/50*   (2006.01)
   *H04N 5/60*   (2006.01)

(56) References Cited

U.S. PATENT DOCUMENTS

| | | | | |
|---|---|---|---|---|
| 2002/0184638 | A1* | 12/2002 | Agnihotri | G11B 27/36 |
| | | | | 725/89 |
| 2005/0034166 | A1 | 2/2005 | Kim et al. | 725/119 |
| 2005/0179809 | A1* | 8/2005 | Yagi | H04N 5/23212 |
| | | | | 348/345 |
| 2010/0082784 | A1* | 4/2010 | Rosenblatt | H04L 12/2812 |
| | | | | 709/222 |
| 2010/0250660 | A1* | 9/2010 | Toda | G06F 3/14 |
| | | | | 709/203 |
| 2011/0164861 | A1* | 7/2011 | Kunkel | H04N 5/76 |
| | | | | 386/343 |
| 2011/0185009 | A1* | 7/2011 | Chang | G06F 3/023 |
| | | | | 709/203 |
| 2012/0110131 | A1 | 5/2012 | Villagas Nunez et al. | 709/219 |
| 2012/0212575 | A1 | 8/2012 | Chen et al. | 348/42 |
| 2013/0091525 | A1 | 4/2013 | Yoon et al. | 725/52 |
| 2013/0151672 | A1 | 6/2013 | Lee et al. | 709/219 |
| 2013/0297857 | A1* | 11/2013 | Sela | G06F 9/5027 |
| | | | | 711/103 |

FOREIGN PATENT DOCUMENTS

| | | |
|---|---|---|
| KR | 10-2011-0118292 | 10/2011 |
| KR | 10-2012-0096904 | 8/2012 |

\* cited by examiner

IMAGE DISPLAY APPARATUS, METHOD OF DRIVING IMAGE DISPLAY APPARATUS, AND COMPUTER READABLE RECORDING MEDIUM

CROSS-REFERENCE TO RELATED APPLICATIONS

This application claims priority from Korean Patent Application No. 10-2014-0001446, filed on Jan. 6, 2014, in the Korean Intellectual Property Office, the disclosure of which is incorporated herein by reference in its entirety.

BACKGROUND

1. Field

Apparatuses and methods consistent with the embodiments relate to an image display apparatus, a method of driving the image display apparatus, and a computer readable recording medium, and particularly, to an image display apparatus, a method of driving the image display apparatus, and a non-transitory computer readable recording medium, by which resources between televisions (TVs) are shared with each other in a user environment containing TVs with high specification and low specification to maximize a function.

2. Description of the Related Art

In general, an image display apparatus refers to an apparatus for outputting information as an image through or on a screen. A representative example of a computer output apparatus is a monitor. Output data is mostly expressed by a letter, a sign, a figure, an image, a voice, etc. Among these, all data, except for voice, is detected by eyes. In this regard, an apparatus for temporarily displaying the data except for voice through a screen is an image display apparatus.

A representative example of an image display apparatus is a cathode ray tube (CRT). According to a method using a general monitor or a television (TV) Braun tube, light beams are shot to a screen by an electron gun to hit fluorescent substances on a Braun tub to display letters or images. In addition, examples of an image display apparatus includes a liquid crystal display (LCD), a thin film crystal display (TFT-LCD), a plasma display (PDP), a flexible display, and a head mounted display (HMD). The HMD is a next-generation image display apparatus that is mounted on head like glasses to display an image via a large size display or is used for surgery and diagnosis. Compared with other output apparatuses, such as a printer, etc., the HMD does not generate any noise during output and has high operating speed. Since the HMD does not use any sheet, information is obtained at low cost but is not stored in the form of a document.

Such an image display apparatus is ordinarily installed in general home. In some homes, for example, an image display apparatus is installed in the form of TV and a computer or 2 to 3 TVs are ordinarily installed. For example, frequently, in the case of two TVs, one is installed in a living room and the other one is installed in a bedroom.

However, in recent days, as technologies of an image display apparatus, such as an organic light emitting diode (OLED) display, have been developed, and Internet technologies have also been grafted onto TVs and TV-service related technologies have been remarkably developed, numerous TV users have been interested in a purchase of new image display apparatuses. However, in accordance with current trends, most users cannot readily determine to purchase new products due to cost issues.

It is very expensive for users to replace a plurality of image display apparatuses and a new TV becomes rapidly outdated due to rapid development of technologies even if a plurality of image display apparatuses is replaced at one time. Accordingly, there is an urgent need to satisfy the desire of users that have such complaints.

SUMMARY

Exemplary embodiments of the embodiments overcome the above disadvantages and other disadvantages not described above. Also, the embodiments are not required to overcome the disadvantages described above, and an exemplary embodiment may not overcome any of the problems described above.

The embodiments provide an image display apparatus, a method of driving the image display apparatus, and a non-transitory computer readable recording medium, by which resources between televisions (TVs) are shared with each other in a user environment containing TVs with high specification and low specification to maximize a function.

According to an aspect of the embodiments, an image display apparatus for communicating with a peripheral device includes at least one operation executor is configured to perform a random operation, a communication interface is configured to request resource sharing with the peripheral device and to receive a result of the request in order to share resource of the peripheral device, and a controller is configured to control the communication interface for the request and the reception and to control the operation executor to perform the operation according to the received result.

The peripheral device may be a device for displaying an image.

The controller may perform a pairing operation with the peripheral device in order to share a resource of the peripheral device and share information about the resource according to the pairing operation.

The peripheral device may be a tuner, the controller may request a channel scan using the tuner of the peripheral device, receive a channel scan result according to the request, and display the channel scan result on the operation executor, and the operation executor may be a display.

The peripheral device may perform a high resource function improved compared with the image display apparatus, and the controller may request the peripheral device to perform the high resource function, and operate the operation executor according to a reception result according to the request.

The image display apparatus may display various contents that a user enjoys according to a category of a plurality of regions of one main image to perform the high resource function, based on the reception result.

The operation executor may include a voice recognizer for recognizing a voice, and the controller may transmit voice information input to the peripheral device through the voice recognizer, receive an analysis result of the transmitted voice information, and operate the operation executor according to the received analysis result.

The operation executor may perform at least one operation of volume control, channel change, and power on/off according to the analysis result.

The image display apparatus may further include a resource sharing executor configured to store a program for execution of an operation for the resource sharing and to execute the stored program according to a user request under control of the controller.

The controller may store a program for execution of an operation for the resource sharing and execute the stored program according to user request.

According to another aspect of the embodiments, a method of driving an image display apparatus includes requesting resource sharing with a peripheral device in order to share a resource of the peripheral device, receiving a result of the request from the peripheral device, and performing a random operation according to the received result.

The method may further include performing a pairing operation with the peripheral device in order to share the resource of the peripheral device, and pre-storing information about the resource according to the pairing operation, wherein the requesting of the resource sharing includes requesting resource sharing associated with the pre-stored information.

The requesting of the resource sharing may be a request for broadcast program channel scan, and the performing of the random operation may include receiving a channel scan result according to the request and displaying the channel scan result on a screen.

The requesting of the resource sharing may include requesting the peripheral device to perform a high resource improved function, and the performing of the operation may include displaying various contents that a user enjoys according to a category of a plurality of regions of one main image, based on an execution result of the high resource improved function.

The requesting of the resource sharing includes transmitting voice information input to the peripheral device through the voice recognizer to request analysis, and the performing of the operation may include performing at least one operation of volume control, channel change, and power on/off according to an analysis result of the voice information.

According to another aspect of the embodiments, a non-transitory computer readable recording medium for execution of a method of driving an image display apparatus, wherein the method includes requesting resource sharing with a peripheral device in order to share a resource of the peripheral device, receiving a result of the request from the peripheral device, and performing a random operation according to the received result.

Additional and/or other aspects and advantages of the embodiments will be set forth in part in the description which follows and, in part, will be obvious from the description, or may be learned by practice of the embodiments.

BRIEF DESCRIPTION OF THE DRAWING FIGURES

The above and/or other aspects of the embodiments will be more apparent by describing certain exemplary embodiments of the embodiments with reference to the accompanying drawings, in which.

DETAILED DESCRIPTION OF THE EXEMPLARY EMBODIMENTS

Certain exemplary embodiments will now be described in greater detail with reference to the accompanying drawings.

Figure 1:
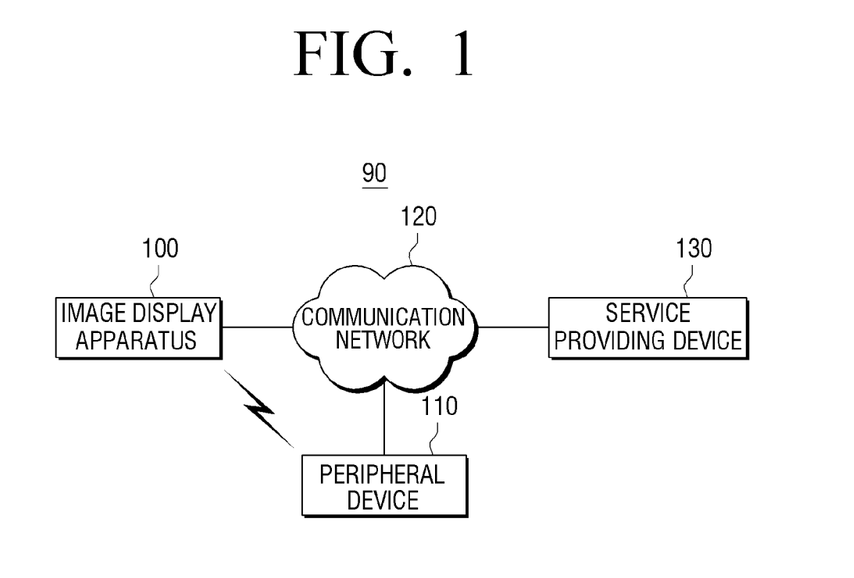
FIG. 1 is a diagram illustrating a resource sharing system according to an embodiment.

FIG. 1 is a diagram illustrating a resource sharing system 90 according to an embodiment.

As illustrated in FIG. 1, the resource sharing system 90 according to the present embodiment includes an image display apparatus 100, a peripheral device 110, a communication network 120, and a service providing device 130.

The image display apparatus 100 according to the present embodiment includes a touchscreen type image display apparatus, a self-light emitting display apparatus such as an organic light emitting diode (OLED) display, or a non-emissive display apparatus such as a liquid crystal display (LCD) apparatus. Needless to say, the image display apparatus 100 may also be a display apparatus such as a computer or a cellular phone, not a television (TV). Here, the non-emissive display apparatus refers to an apparatus having a separate backlight unit providing light. In this case, the backlight unit may include an LED, or the like.

The image display apparatus 100 may perform an independent operation to use services provided by the service providing device 130 through the communication network 120. However, in some embodiments, the image display apparatus 100 may use services in conjunction with the peripheral device 110. For example, when the image display apparatus 100 has resources with a new function, that is, a high specification, compared with the peripheral device 110, the image display apparatus 100 may use a rapid program search service using resources, such as tuner of the peripheral device 110. On the other hand, when the image display apparatus 100 has a low specification compared with the peripheral device 110, the image display apparatus 100 may operate like a high-specification apparatus such as the peripheral device 110. That is, the peripheral device 110 may operate as a cloud device of the image display apparatus 100.

For example, when the image display apparatus 100 has a high specification but has only one tuner, the same effect as in a case using two tuners may be achieved using a tuner of the peripheral device 110. Needless to say, in this case, the image display apparatus 100 may have a program (or an application) for supporting two tuners. When the image display apparatus 100 has two tuners, the same effect as in a case using three tuners may be achieved. Furthermore, when the image display apparatus 100 has a low specification and includes a voice recognizer, such as a microphone, but has no program for supporting the voice recognizer, the image display apparatus 100 may transmit voice recognizing information to the peripheral device 110 and receive an analysis result about the voice recognizing information from the peripheral device 110 to operate according to the analysis result. For example, in response to user change in channel through the voice recognizer of the image display apparatus 100 or voice recognizing information indicating volume up being provided to the peripheral device 110, the peripheral device 110 may analyze the information to provide a command for channel change or volume up to the image display apparatus 100, and the image display apparatus 100 may perform a corresponding operation based on the received command.

Thus far, a channel scan of a broadcast program or channel or a volume control has been exemplified. However, it may be possible to perform various other examples, such as power on/off. Accordingly, embodiments are not particularly limited to the above cases. In other words, the image display apparatus 100 may use software (S/W) such as analysis of voice recognizing information as well as physical hardware (H/W) resources of the peripheral device 110, such as a tuner.

For this resource sharing, the image display apparatus 100 may previously perform pairing with the peripheral device 110. In other words, assuming that the image display apparatus 100 performs a resource sharing operation via local area communication with the peripheral device 110, resource sharing may be performed only on a permitted apparatus for smooth an operation. To this end, the image display apparatus 100 needs to know information about the peripheral device 110 and the peripheral device 110 needs to information about the image display apparatus 100. During this process, both the image display apparatus 100 and the peripheral device 110 need to know resource information about an opposite side. In other words, only when an apparatus pre-stores information about hardware and software resources supportable by the opposite apparatus, does the apparatus inform a user of information about a resource supportable by an opposite apparatus and operate in conjunction with the opposite apparatus according to user request based on the information.

For example, when the peripheral device 110 supports a smart hub function as a high resource function compared with the image display apparatus 100, that is, a function of displaying a plurality of icons on a plurality of icons of one main screen, the image display apparatus 100 may recognize that this support is achieved via a pairing operation. Thus, in response to a user command being received from an external source, the image display apparatus 100 may use the high resource function.

The peripheral device 110 is the same type of the image display apparatus 100 and includes an apparatus for displaying an image. Needless to say, the peripheral device 110 does not have to display an image and may be any type of apparatus as long as the apparatus is disposed around the image display apparatus 100 and supports resources contained in the peripheral device 110 and the image display apparatus 100 may perform a predetermined operation through the resources. However, according to an embodiment, when the image display apparatus 100 is a TV, the peripheral device 110 may be the same type of TV. Needless to say, even if the peripheral device 110 is not the same type of TV, the peripheral device 110 may be a mobile flash module (MFM) having a TV function, such as a computer monitor. In this case, according to an embodiment, the peripheral device 110 may have a high specification or a low specification according to performance of the image display apparatus 100. In other words, according to embodiments, the image display apparatus 100 has a high specification and further requires resources of the peripheral device 110 with low specification, or the image display apparatus 100 has low specification and uses a high resource function of the peripheral device 110 with low specification.

According to an embodiment, the peripheral device 110 may perform local area communication in order to perform an operation resource share with the image display apparatus 100. From this point of view, the peripheral device 110 includes a local area communication module like the image display apparatus 100. Needless to say, even if two devices are capable of being connected via a cable, the devices may be connected via wireless communication in consideration of effective use of inner spaces.

The communication network 120 includes a wired/wireless communication network. Here, the wire communication network includes the Internet, such as a cable network or a public switched telephone network (PSTN), and the wireless communication network includes code division multiple access (CDMA), wideband code division multiple access (WCDMA), global system for mobile communications (GSM), evolved packet core (EPC), long term evolution (LTE), a wibro network, etc. Thus, when the communication network 120 is a wired communication network, an access point may access a telephone exchange of a telephone company. When the communication network 120 is a wireless communication network, an access point may access a serving GPRS support node (SGSN) or gateway GPRS support node (GGSN) managed by a communication company to process data or access various relay stations such as base station transmission (BTS), NodeB, e-NodeB, etc. to process data.

The communication network 120 includes a small station (AP), such as a femto or pico station, that is ordinarily installed in a building. Here, according to classification as a small station, the femto and pico stations are differentiated from each other according to the maximum number of image display apparatuses 100 and peripheral devices 110 that the station accesses. Needless to say, the AP includes a local area communication module for local area communication such as Zigbee, Wi-Fi, etc. with the image display apparatus 100 and the peripheral device 110. According to an embodimentlocal area communication may be performed according to various standards such as Bluetooth, Zigbee, infrared data association (IrDA), ultra high frequency (UHF), very high frequency (VHF), radio frequency (RF), ultra wideband (UWB), etc. as well as Wi-Fi. Accordingly, an AP extracts a position of a data packet, determines a best communication path of the extracted position, and transmits the data packet to a next apparatus, for example, the image display apparatus 100 and the peripheral device 110 along the determined communication path.

The service providing device 130 includes, for example, a broadcast server managed by a broadcast station or a server of a portal service company as an Internet service provider. The service providing device 130 provides broadcast content, that is, a broadcast signal of a program of a broadcast channel selected by a user in the image display apparatus 100 and the peripheral device 110. In addition, in response to a request for a broadcasting schedule in the image display apparatus 100 and the peripheral device 110 by a user, the service providing device 130 may provide additional information about the broadcasting schedule. Furthermore, the service providing device 130 may recommend content. In other words, the service providing device 130 may establish recommended content based on a watching history of a user of the image display apparatus 100 and provide the corresponding content. In this case, the recommended content may be displayed in the form of a thumbnail image. In addition, the service providing device 130 may provide an image for supporting the aforementioned smart hub function to generate the thumbnail image using an image received by the image display apparatus 100 and display the generated image on a screen.

According to the aforementioned configuration, users may experience integrated TV functions in an old version TV or a non-updated TV by buying one newest TV or updating firmware. In addition, since a user does not have to buy a plurality of TVs at one time, the user may conserve purchasing cost.

The possibility that a consumer who already has a TV available from a specific company buys a product available from the company may be increased when he or she wants to further buy a TV, an MFM, etc.

A TV and MFM available from a specific company are configured based on one platform, and thus, the TV and the MFM may use a system that selectively supports functions according to whether a function is supportable by a shared apparatus.

An embodiment may provide a system that collects resources or functions of an idle TV or display apparatus of one home or office and uses the resources and the functions.

Figure 2:
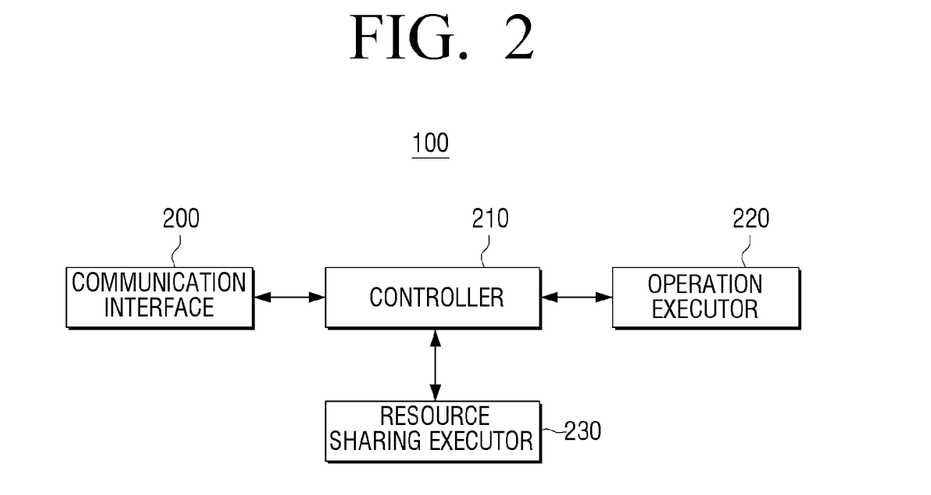
FIG. 2 is a block diagram illustrating a detailed structure of an image display apparatus of FIG. 1.

FIG. 2 is a block diagram illustrating a detailed structure of the image display apparatus 100 of FIG. 1.

Referring to FIG. 2 together with FIG. 1, the image display apparatus 100 according to the present embodiment includes all or some of a communication interface 200, a controller 210, an operation executor 220, and a resource sharing executor 230.

Here, the expression "includes all or some" means that some components such as the resource sharing executor 230 is integrated with other components, such as the controller 210. However, to aid understanding, the case in which the image display apparatus 100 includes the all components will be described below.

The communication interface 200 may perform communication with an AP in the communication network 120 according to user request such that a user uses services provided by the service providing device 130. In addition, when the user intends to share resources of the peripheral device 110, the communication interface 200 may perform an operation for this. For example, the image display apparatus 100 requests resource sharing with the peripheral device 110 through the communication interface 200 and receives a result of the request. During this process, the communication interface 200 may also transmit information about a resource that is shared by the user. Here, the information is information about a resource supportable by the peripheral device 110. The resource may be substantially shared by performing a pairing operation when the image display apparatus 100 and the peripheral device 110 are installed. Likewise, information about supportable resource is already known, and thus, a smooth operation may be possible.

For example, in response to a request, for use of a tuner of the peripheral device 110 with a low specification, being transmitted through the communication interface 200, while the tuner of the peripheral device 110 is being used, the communication interface 200 receives a response indicating that the use is impossible in response to the request. When it is possible to use the tuner of the peripheral device 110, in response to request for resource sharing and request for program channel scan, the peripheral device 110 may perform a channel scan through the tuner of the peripheral device 110 and provide the scan result to the communication interface 200.

In addition, in response to a request, for operations of a smart hub function and analysis of voice recognizing information, being transmitted from the image display apparatus 100 with a low specification to the peripheral device 110 with a high specification, the communication interface 200 may receive a result of the request. In other words, in response to image data being obtained after the peripheral device 110 performs a smart hub function, the communication interface 200 may receive the image data and transmit the image data to the controller 210. In addition, the communication interface 200 may receive the analysis result of the voice recognizing information from the peripheral device 110 and transmit the analysis result to the controller 210.

The controller 210 controls an overall operation of the communication interface 200, the operation executor 220, and the resource sharing executor 230. In other words, when a user requests resource sharing with the peripheral device 110 or the image display apparatus 100 determines that resource of the peripheral device 110, for example, voice recognition needs to be shared, the controller 210 may control the components to perform the resource sharing. To this end, the controller 210 may operate the resource sharing executor 230. In other words, when a separate program for resource sharing is stored in the resource sharing executor 230, the controller 210 may execute a program in the resource sharing executor 230. When the resource sharing executor 230 is integrated with the controller 210, the controller 210 may execute an internal program.

The controller 210 may request resource sharing with the peripheral device 110, receive various results in response to the request, and operate the operation executor 220 according to the received results. For example, when the received result is a result of program channel scan, the controller 210 displays this result on the operation executor 220. In this case, the operation executor 220 may be a display. In addition, when the received result is an analysis result of voice recognizing information for requesting selection of a specific channel, the controller 210 may control the operation executor 220 to control the current channel to the change to corresponding channel according to the analysis result.

The controller 210 may process various pieces of information for resource sharing of the peripheral device 110. In addition, the controller 210 may perform various operations so as to support an interface with a user, and for example, execute the resource sharing executor 230 to ask a user to share a resource.

The operation executor 220 may include a display and functional blocks for performing various functions of adjusting a channel or a volume and powering on/off. According to an embodiment, the operation executor 220 may be any functional block as long as the functional block performs an operation according to the received result based on the request for resource sharing. For example, the display may receive a result of a program channel scan and display the result, or may divide one main image into a plurality of regions to display various contents or icons.

The resource sharing executor 230 may store a program for smoothly performing a function for sharing resources with the peripheral device 110 and execute the program under control of the controller 210. The program may be set up when a user buys and initially installs a new version of the image display apparatus 100 or may be frequently provided in the form of a firmware upload via the Internet after the program is set up. In addition, the resource sharing executor 230 may support an interface operation with the user for resource sharing. For example, an operation for asking whether a specific function is to be performed is performed for the user.

Figure 3:
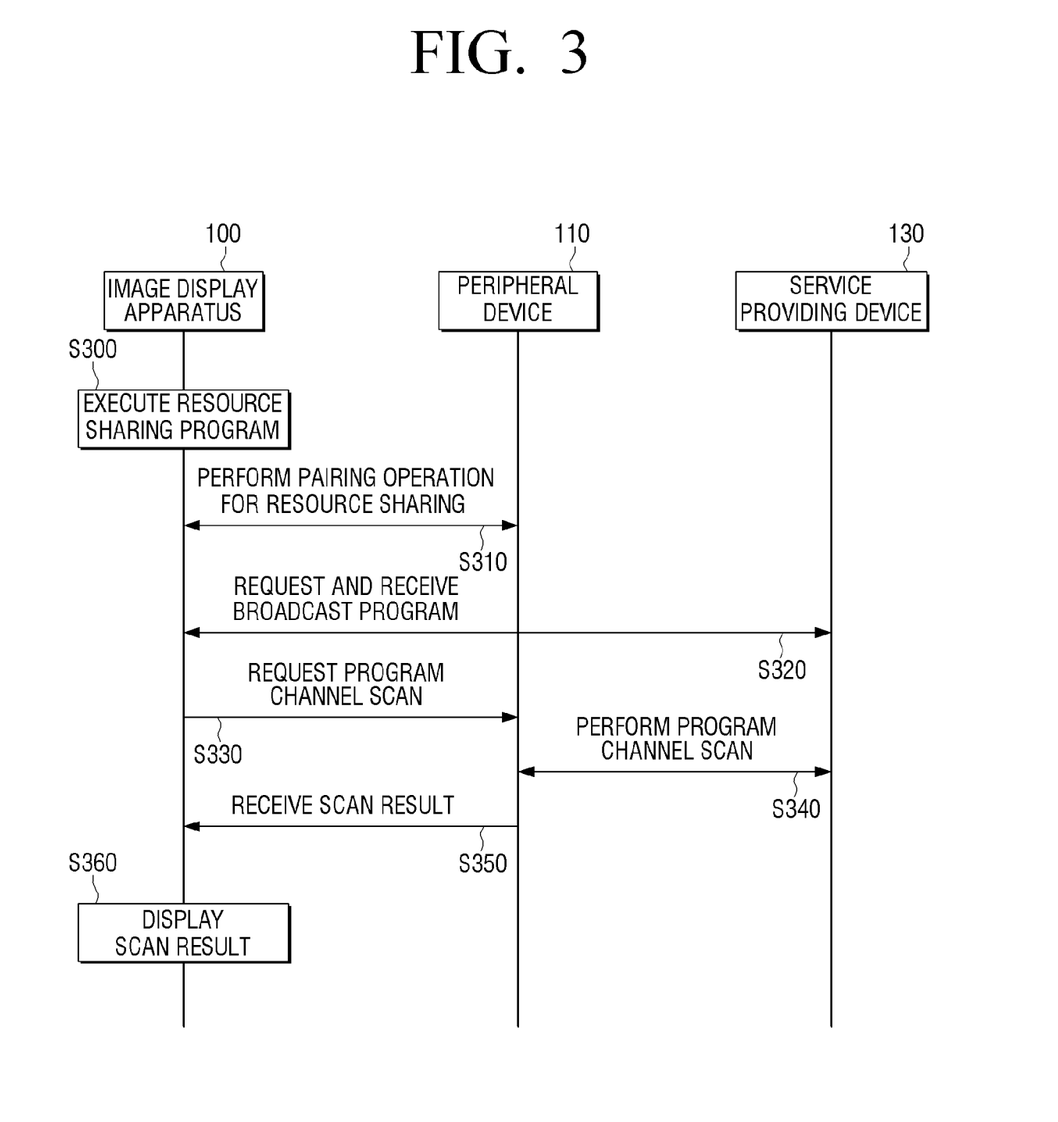
FIG. 3 is a diagram illustrating a resource sharing process according to a first embodiment.
Figure 4:
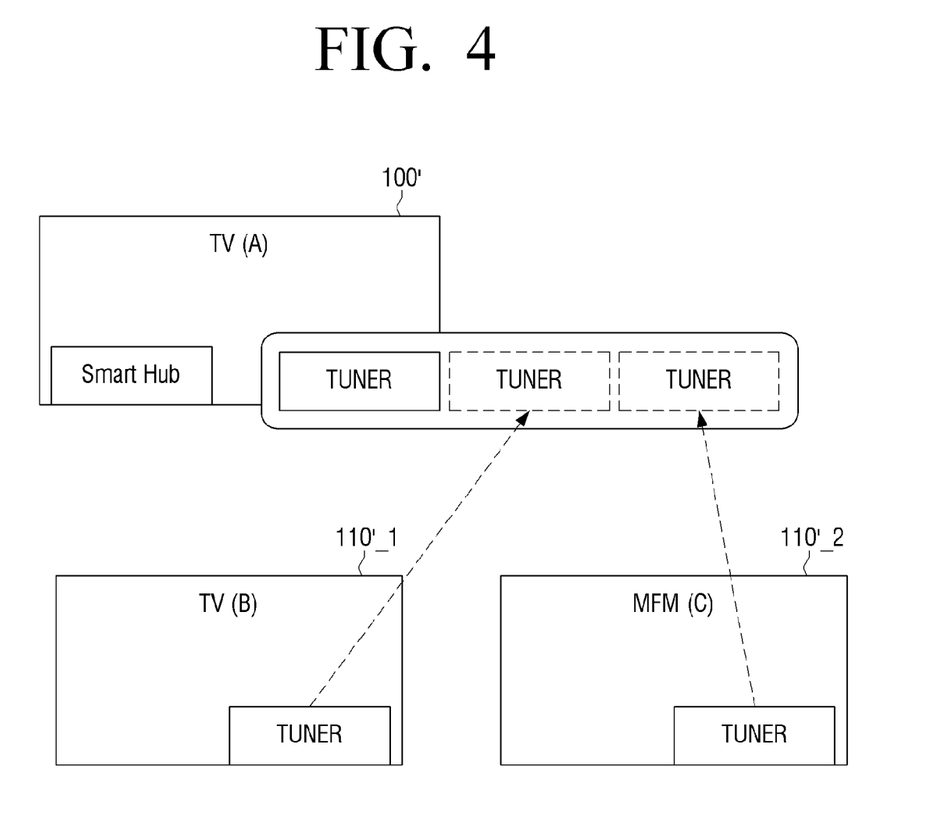
FIG. 4 is a schematic diagram of the process of FIG. 3.

FIG. 3 is a diagram illustrating a resource sharing process according to a first embodiment of the present invention. FIG. 4 is a schematic diagram of the process of FIG. 3.

According to an embodiment, the peripheral device 110 may include a TV 110_1 and an MFM 110_2.

Referring to FIGS. 3 and 4, the image display apparatus 100 according to an embodiment may automatically determine whether resource sharing is to be performed according to initially set-up information and execute a program for resource sharing in response to request, for resource sharing of the peripheral device 110, being transmitted from a user or even if a separate request is not transmitted from the user (S300). For example, when the image display apparatus 100 is turned on, the image display apparatus 100 may determine whether the peripheral device 110 is in an idle state and may automatically display a main image as an initial image according to a smart hub function.

According to the execution of the program, the image display apparatus 100 may perform a pairing operation for resource sharing with the peripheral device 110 (S310). Needless to say, the pairing operation may be performed during initial installation of the image display apparatus 100 and the peripheral device 110 and may be executed according to a separate program that is separately produced from a program used for resource sharing. For the pairing operation, the image display apparatus 100 and the peripheral device 110 may determine a client and a host. In other words, an apparatus that intends to use a resource and function that the apparatus does not have is a client, an apparatus having the corresponding resource and function is a host, and the apparatuses may accept request according to whether the apparatuses are used. Here, in some embodiments, the resource may be interpreted as including a function.

The pairing operation may be performed to determine whether received information is information provided from authorized apparatus based on apparatus information between the image display apparatus 100 and the peripheral device 110. In addition, during the pairing operation, a client and a host may share (or recognize) a supportable function and resource, and thus, the client may request only the resource supportable by the host.

After the pairing operation is performed, the image display apparatus 100 may request a specific broadcast program to the service providing device 130 and receive program data about the specific broadcast program (S320).

For example, during this process, in response to a request, for program channel scan, being transmitted from the user, the image display apparatus 100 may determine whether the corresponding operation is performed, and when the corresponding operation is impossible according to the determination result, the image display apparatus 100 may request resource sharing to the peripheral device 110 (S330).

The peripheral device 110 may determine whether a resource is supportable according to the request of the image display apparatus 100. In other words, when the peripheral device 110 has one tuner and supports a current broadcast, service such that channel scan is impossible, the peripheral device 110 may inform the image display apparatus 100 of that channel scan is impossible. On the other hand, when resource is supportable, the peripheral device 110 may access the service providing device 130 and perform program channel scan (S340).

In addition, the peripheral device 110 provides a scan result to the image display apparatus 100 (S350). The scan result may be provided to the image display apparatus 100 in the form of, for example, program schedule.

For example, in response to information, about program schedule, being received as the scan result, the image display apparatus 100 may display corresponding program information on a screen (S360).

In FIG. 4, when a user watches a specific channel and simultaneously intends to scan a channel containing specific content through a TV A 100' having 1-TUNER with high specification, the TV A 100' may request resource sharing to a TV B 110'_1 or an MFM C 110'_2 as a peripheral apparatus and operate as a 3-TUNER. As a result, for example, the TV A 100' may rapidly obtain a result for channel scan, etc. Needless to say, when the TV B 110'_1 and the MFM C 110'_2 are not currently used, the TV A 100' may operate as a 3-TUNER, but when one of the TV B 110'_1 and the MFM C 110'_2 is used, the TV A 100' may operate as a 2-TUNER. When both the TV B 110'_1 and the MFM C 110'_2 are in an idle state, all channels may be divided in half and channels containing specific content may be scanned in response to request for channel scan, thereby increasing scan time.

Figure 5:
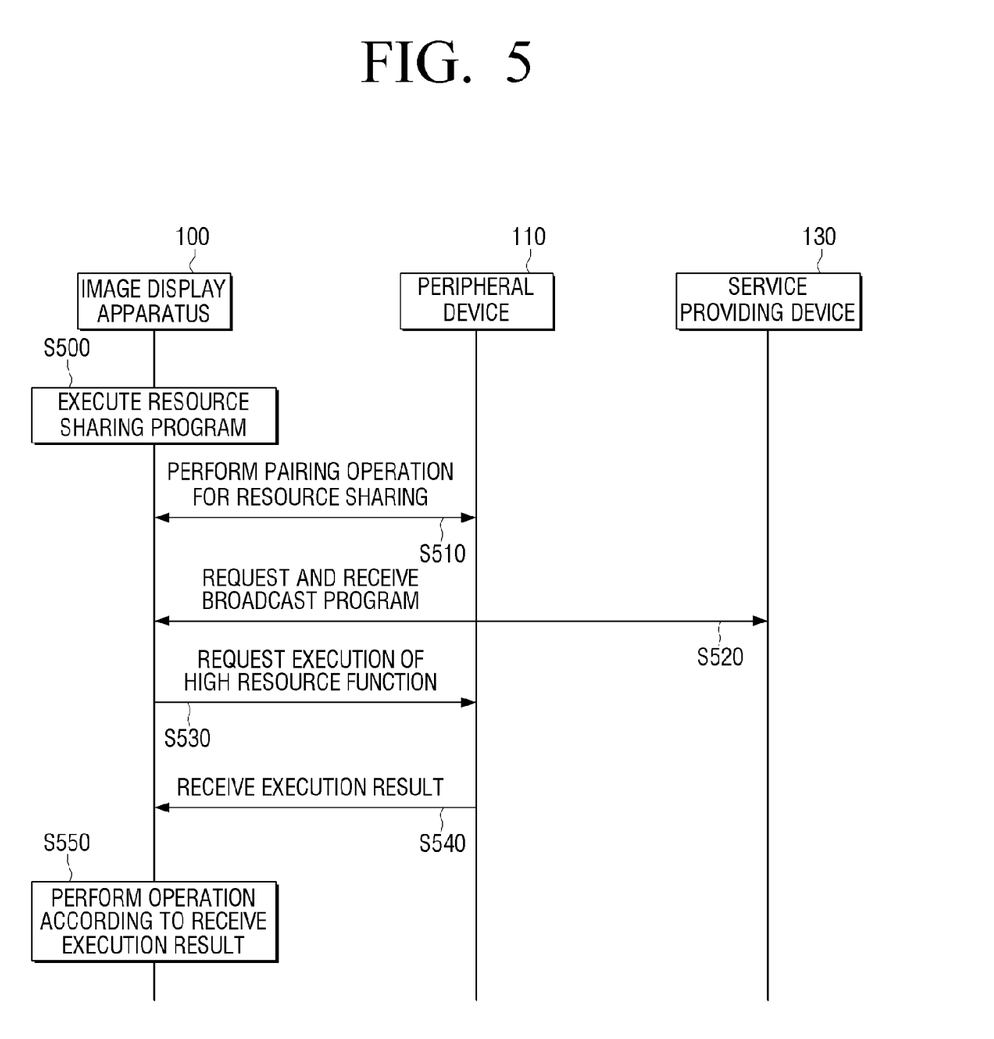
FIG. 5 is a diagram illustrating a resource sharing process according to a second embodiment.
Figure 6:
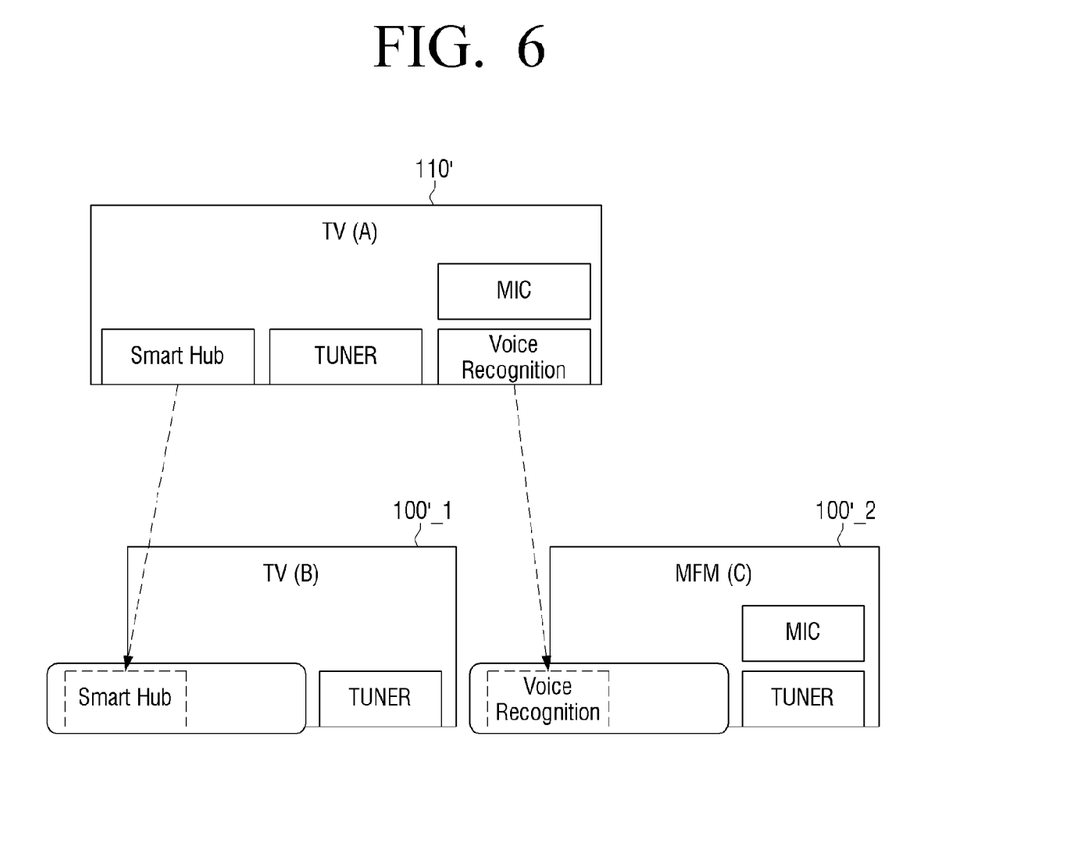
FIG. 6 is a schematic diagram of the process of FIG. 5.

FIG. 5 is a diagram illustrating a resource sharing process according to a second embodiment. FIG. 6 is a schematic diagram of the process of FIG. 5.

Referring to FIG. 5, the peripheral device 110 may have a high resource improved function compared with the image display apparatus 100 and execute the function. Here, the high resource improved function may refer to, for example, software resource that is executed with difficulty in the image display apparatus 100 with a low specification, such as a smart hub function.

Referring to FIG. 5, the image display apparatus 100 according to an embodiment may automatically determine whether resource sharing is to be performed according to initially set-up information and execute a program for resource sharing in response to request, for resource sharing of the peripheral device 110, being transmitted from a user or even if a separate request is not transmitted from the user (S500).

Prior to this, the image display apparatus 100 may perform a pairing operation for resource sharing with the peripheral device 110 (S510). The pairing operation has been sufficiently described with reference to FIG. 3, and thus, a detailed description thereof will be omitted below.

After the pairing operation is performed, the image display apparatus 100 may request a broadcast program from the service providing device 130 and become in a reception state according to user request. (S520).

During this process, the image display apparatus 100 may request the peripheral device 110 to perform a high resource function (S530). Although the high resource function will be described with reference to FIG. 6, the high resource function may refer to a smart hub function, a voice recognizing function, or the like that is not executed by the image display apparatus 100 with low specification. However, the smart hub function may be executed during power on. Accordingly, in this case, operation S530 may be omitted.

Then, the image display apparatus 100 receives an execution result of the high resource function from the peripheral device 110 (S540). For example, when the image display apparatus 100 includes a microphone for voice recognition but has no program for supporting the microphone, in response to a request, for analysis of recognized voice information, being transmitted to the peripheral device 110, the image display apparatus 100 may receive analysis result from the peripheral device 110.

Then, the image display apparatus 100 may perform an operation according to the received execution result received from the peripheral device 110 (S550). Here, various operations may be present. For example, in response to a smart hub function being requested, the image display apparatus 100 may receive specific image data configured by the peripheral device 110 and display the image data on a screen, and in response to analysis, of voice recognizing information, being requested, the image display apparatus 100 may adjust volume and change a channel according to the analysis result received from the peripheral device 110. Alternatively, power may be turned on/off.

In FIG. 6, when a TV B 100'_1 that functions as the image display apparatus 100 of FIG. 5 intends to use a smart hub function that the TV B 100'_1 does not have, in response to a smart hub function being requested to a TV A 110' and an MFM C 100'_2, in particular, only to the TV A 110' as the peripheral device 110, the TV A 110' that is capable of supporting the smart hub function and is currently in an idle state may support the smart hub function for the TV B 100'_1 in response to the TV B 100'_1. On the other hand, when the MFM C 100'_2 that functions as the image display apparatus 100 requests the TV A 110' and the TV B 100'_1, in particular, only to the TV A 110' as the peripheral device 110 to perform resource sharing, that is, a high resource function, the TV A 110' that is capable of supporting the high resource function and is currently in an idle state may indicate that the TV A 110' is capable of supporting the function in response to the MFM C 100'_2, receive and analyze voice input from the MFM C 100'_2, and then provide a voice recognizing result to the MFM C 100'_2. As a result, the MFM C 100'_2 may perform operations such as channel change, volume control, power on/off, etc. according to the voice recognizing result. For example, for voice recognition in the MFM C 100'_2, the corresponding module needs to be in an enabled state. Furthermore, in response to information being received from the MFM C 100'_2, the TV A 110' may enable internal functional blocks to process voice recognizing information.

Figure 7:
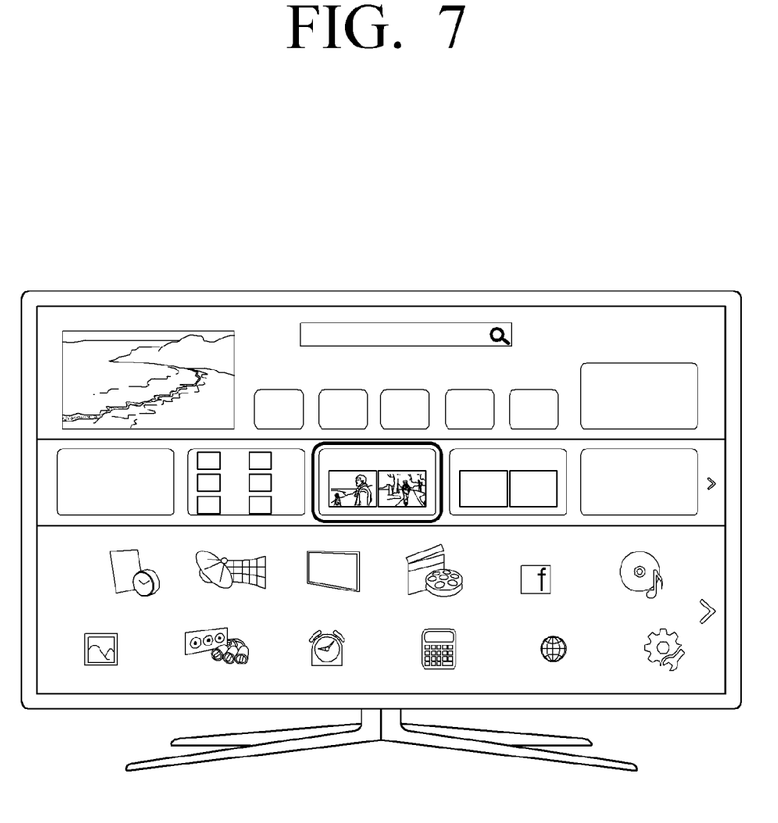
FIG. 7 is a diagram for explanation of a smart hub function of FIGS. 6.

FIG. 7 is a diagram for explanation of a smart hub function of FIG. 6.

Referring to FIG. 7 together with FIG. 6, the TV B 100'_1 according to an embodiment may not perform the smart hub function of displaying an image illustrated in FIG. 7. For example, this is because a memory for performing the smart hub function is not enough. For example, in this situation, when the TV B 100'_1 is turned on, the TV B 100'_1 may determine whether the TV A 110' is in an idle state, and when the it is determined that the TV A 110' is in an idle state, resource of the TV A 110' may be shared to embody an image based on the smart hub function as illustrated in FIG. 7. FIG. 7 illustrates a main image that is initially provided when the TV B 100'_1 is turned on, as an image displayed according to execution of the smart hub function. As illustrated in FIG. 7, one main image may be divided into a plurality of regions and various contents or icons may be displayed in respective the regions.

Figure 8:
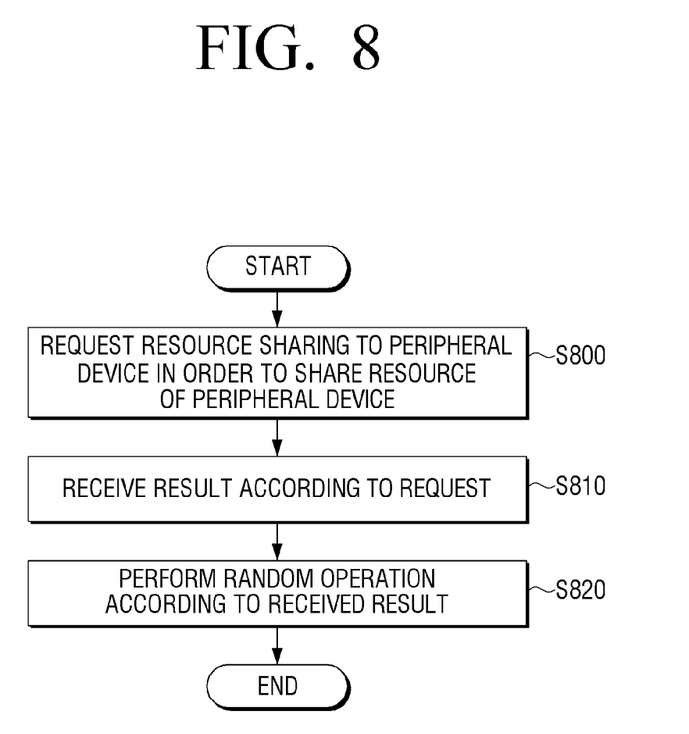
FIG. 8 is a flowchart illustrating a driving process of an image display apparatus according to an embodiment.

FIG. 8 is a flowchart illustrating a driving process of an image display apparatus according to an embodiment.

Referring to FIG. 8 together with FIG. 1 for convenience of description, the image display apparatus 100 according to an embodiment may request resource sharing to the peripheral device 110 for resource sharing with the peripheral device 110 (S800). In this case, it is assumed that a pairing operation between the image display apparatus 100 and the peripheral device 110 is performed.

Then, the image display apparatus 100 receives a request result from the peripheral device 110 (S810). Here, as described above, the received result may be image data obtained by executing the smart hub function or an analysis result obtained by analyzing voice recognizing information.

In addition, the image display apparatus 100 performs an operation according to the received result (S820). Here, the operation may be an operation of displaying received image data on a screen, changing a channel according to an analysis result of voice information, or controlling volume.

Even if cases in which all components according to embodiments are integrated or operate have been described, the embodiments are not limited thereto. That is, one or more of the all components may be selectively combined and may operate within the scope of the embodiments. In addition, the all components may each be embodied as independent hardware, but all or some of the components may be selectively combined to be embodied as a computer program having a program module for execution of all or some of combined functions in one or more hardware. Codes and code segments of the computer program are easily induced by one of ordinary skill in the art. The computer program may be stored in computer readable non-transitory computer readable media may be read by a computer to embody embodiments.

Here, the non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

The foregoing exemplary embodiments and advantages are merely exemplary and are not to be construed as limiting the embodiments. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image display apparatus for communicating with a peripheral device, comprising:
    at least one operation executor configured to perform an operation;
    a communication interface configured to request resource sharing with the peripheral device and to receive a result of the request in order to share a resource of the peripheral device, the resource of the peripheral device being a tuner; and
    a controller configured to control the communication interface for the request and a reception, and to control the operation executor to perform the operation according to the result received,
    wherein the controller requests a channel scan using the tuner of the peripheral device, receives a channel scan result, and displays the channel scan result on the operation executor.

2. The image display apparatus as claimed in claim 1, wherein the peripheral device is a device for displaying an image.

3. The image display apparatus as claimed in claim 1, wherein the controller performs a pairing operation with the peripheral device in order to share the resource of the peripheral device and shares information about the resource according via the pairing operation.

4. The image display apparatus as claimed in claim 1, wherein:
    the operation executor is a display.

5. The image display apparatus as claimed in claim 1, wherein:
    the peripheral device performs a high resource function improved as compared with the image display apparatus; and
    the controller requests the peripheral device to perform the high resource function, and operates the operation executor according to a reception result.

6. The image display apparatus as claimed in claim 5, wherein the image display apparatus displays various contents that a user enjoys according to a category of a plurality of regions of one main screen to perform the high resource function, based on the reception result.

7. An image display apparatus for communicating with a peripheral device, comprising:
    at least one operation executor configured to perform an operation;
    a communication interface configured to request resource sharing with the peripheral device and to receive a result of the request in order to share a resource of the peripheral device; and a controller configured to control the communication interface for the request and a reception, and to control the operation executor to perform the operation according to the result received,
wherein the operation executor comprises a voice recognizer for recognizing voice; and
the controller transmits voice information input to the peripheral device through the voice recognizer, receives an analysis result of the voice information transmitted, and operates the operation executor according to the analysis result received.

8. The image display apparatus as claimed in claim 7, wherein the operation executor performs at least one operation of volume control, channel change, and power on/off according to the analysis result.

9. The image display apparatus as claimed in claim 1, further comprising a resource sharing executor configured to store a program for execution of an operation for the resource sharing and to execute the program stored according to user request under control of the controller.

10. The image display apparatus as claimed in claim 1, wherein the controller stores a program for execution of an operation for the resource sharing and executes the program according to user request.

11. A method of driving an image display apparatus, the method comprising:
requesting resource sharing with a peripheral device in order to share a resource of the peripheral device, the resource of the peripheral device being a tuner;
receiving a result of the request from the peripheral device; and
performing an operation according to the result received,
wherein the requesting resource sharing is a request for broadcast program channel scan, and
the performing the operation comprises receiving a channel scan result according to the request and displaying the channel scan result on a screen.

12. The method as claimed in claim 11, further comprising:
performing a pairing operation with the peripheral device in order to share the resource of the peripheral device; and
pre-storing information about the resource according to the pairing operation,
wherein the requesting of the resource sharing comprises requesting resource sharing associated with the information prestored.

13. The method as claimed in claim 11, wherein:
the requesting resource sharing comprises requesting the peripheral device to perform a high resource improved function; and
the performing the operation comprises displaying various contents that a user enjoys according to a category of a plurality of regions of one main screen, based on an execution result of the high resource improved function.

14. A method of driving an image display apparatus, the method comprising:
requesting resource sharing with a peripheral device in order to share a resource of the peripheral device, the resource of the peripheral device being a tuner;
receiving a result of the request from the peripheral device; and
performing an operation according to the result received,
wherein the requesting resource sharing comprises transmitting voice information input to the peripheral device through a voice recognizer to request analysis; and
the performing the operation comprises performing an operation according to an analysis result of the voice information.

15. A computer readable non-transitory recording medium for execution of a method of driving an image display apparatus, wherein the method comprises:
requesting resource sharing with a peripheral device in order to share a resource of the peripheral device, the resource of the peripheral device being a tuner;
receiving a result of a request from the peripheral device; and
performing an operation according to the result received,
wherein the requesting resource sharing is a request for broadcast program channel scan, and
the performing the operation comprises receiving a channel scan result according to the request and displaying the channel scan result on a screen.

16. The method as claimed in claim 14, wherein the operation comprises at least one operation of volume control, channel change, and power on/off.

* * * * *